United States Patent
Boreanaz et al.

(10) Patent No.: US 7,802,833 B2
(45) Date of Patent: Sep. 28, 2010

(54) TUNNEL CONSOLE FOR PASSENGER COMPARTMENT OF A VEHICLE

(75) Inventors: Giovanni Boreanaz, Orbassano (IT); Federica Fino, Orbassano (IT); Angelo Storgato, Orbassano (IT)

(73) Assignee: C.R.F. Societa Consortile per Azioni, Orbassano (IT)

( * ) Notice: Subject to any disclaimer, the term of this patent is extended or adjusted under 35 U.S.C. 154(b) by 0 days.

(21) Appl. No.: 12/289,421

(22) Filed: Oct. 28, 2008

(65) Prior Publication Data

US 2009/0134649 A1 May 28, 2009

(30) Foreign Application Priority Data

Oct. 31, 2007 (EP) ................... 07425689

(51) Int. Cl. *B60J 7/00* (2006.01)
(52) U.S. Cl. .................... 296/24.34; 296/37.8
(58) Field of Classification Search ............... 296/37.8, 296/24.34, 208
See application file for complete search history.

(56) References Cited

U.S. PATENT DOCUMENTS

| | | | |
|---|---|---|---|
| 5,562,331 A | 10/1996 | Spykerman et al. | |
| 5,902,181 A * | 5/1999 | Bain | 454/144 |
| 2008/0079279 A1* | 4/2008 | Spykerman et al. | 296/24.34 |
| 2009/0146444 A1* | 6/2009 | Ichimaru | 296/37.8 |

FOREIGN PATENT DOCUMENTS

| | | |
|---|---|---|
| DE | 19542198 A1 | 5/1997 |
| DE | 19826943 A1 | 12/1999 |
| EP | 0189051 A2 | 7/1986 |
| EP | 0219632 A1 | 4/1987 |
| JP | 9328039 | 12/1997 |

OTHER PUBLICATIONS

European Search Report mailed Apr. 23, 2008 in European Application No. 07425689.2-1523.

* cited by examiner

*Primary Examiner*—Joseph D Pape
(74) *Attorney, Agent, or Firm*—Davidson Berquist Jackson & Gowdey LLP

(57) ABSTRACT

A console of a tunnel for the passenger compartment of a vehicle has an outer structure that houses, in a fixed position, a glove compartment fitted with a hatch; the console has a wall, which is positioned outside of said compartment and is movable, in response to an action by the user, with respect to an upper surface of the structure, between a lowered position and a raised position, so as to project upwards with respect to this upper surface and define an outer compartment when located in the raised position.

16 Claims, 8 Drawing Sheets

TUNNEL CONSOLE FOR PASSENGER COMPARTMENT OF A VEHICLE

The present invention concerns a tunnel console for the passenger compartment of a vehicle.

BACKGROUND OF THE INVENTION

As is known, the front seats of vehicles are positioned on opposite sides of the so-called tunnel, upon which a console having glove compartments, armrests, ashtrays, holders for mobile phone, etc., is mounted.

There is a need perceived to create a relatively compact console, but equipped with versatile glove compartments, which can be used as needed, allowing the aesthetics of the passenger compartment to be improved and have an ease of use that makes the journey comfortable.

SUMMARY OF THE INVENTION

The object is that of embodying a tunnel console for the passenger compartment of a vehicle, which allows the above-indicated need to be met in a simple and economic manner.

A tunnel console for the passenger compartment of a vehicle is disclosed in the form of a console and comprises an outer structure, at least one inner compartment placed in a fixed position in the structure, and includes a hatch that is movable between a closed position and an open position to close/open an entrance of the inner compartment. The tunnel console also includes a wall positioned outside of the inner compartment and movable, in response to an action by the user, between a raised position and a lowered position with respect to an upper surface of the structure; when located in the raised position, the wall projects upwards with respect to the upper surface and defines an outer compartment.

Preferably, the outer compartment has a base surface defined by said hatch, when said hatch is located in the closed position.

BRIEF DESCRIPTION OF THE DRAWINGS

For a better understanding of the tunnel console, a preferred embodiment shall now be described, purely by way of a non-limitative example, with reference to the enclosed drawings, where.

DETAILED DESCRIPTION OF THE INVENTION

Figure 1:
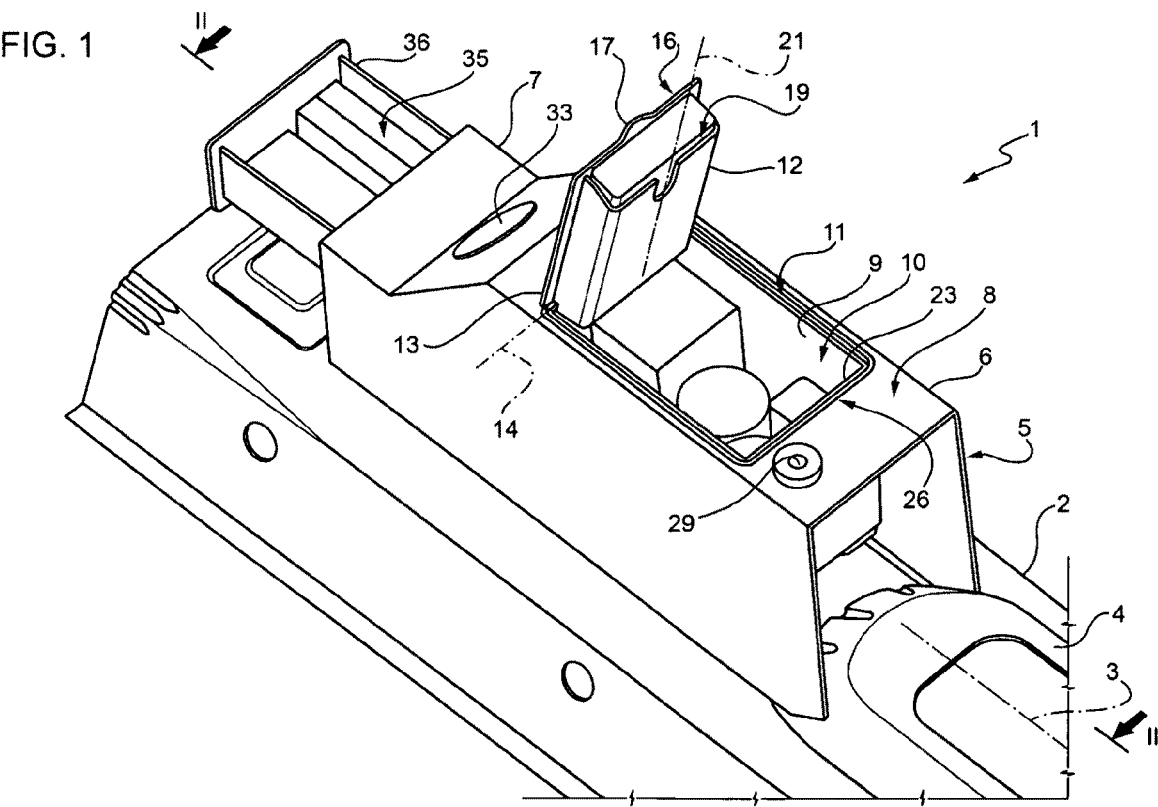
FIG. 1 is a schematic, perspective view of the tunnel console for the passenger compartment of a vehicle, according to the present invention.

In FIG. 1, reference numeral 1 indicates a console placed on a tunnel 2 (partially shown) in the passenger compartment of a vehicle. The tunnel console 1 extends along the longitudinal direction 3 of vehicle travel and is positioned between two front seats (not shown) of the passenger compartment and behind a portion of the tunnel 4 defining a support and, possibly, a pass-through opening for a lever device (not shown) that operates the hand brake of the vehicle. It should be noted that the words "behind", "front", "rear", "side", etc. are used with reference to the direction of travel of the vehicle along direction 3.

The tunnel console 1 comprises an outer structure 5 (shown in a simplified manner) that, in turn, comprises a front portion 6 facing towards the portion of the tunnel 4 and a rear portion 7 facing towards the rear seats (not shown) of the passenger compartment.

Portion 6 has an substantially flat upper surface 8, defining a substantially horizontal upper rest, and houses a container 9, which is connected in a fixed position with respect to the structure 5, in a known manner and not described in detail, and which internally defines a glove compartment 10.

The compartment 10 has a top-access opening 11, which is opened/closed by lifting/lowering a hatch 12 carried by the structure 5. In particular, the hatch 12 comprises a rear portion 13 hinged to the structure 5 or the container 9, in a manner not shown in detail, to turn around an axis 14, horizontal and orthogonal to direction 3, between an open position (FIG. 1) and a closed position (FIG. 2), in which an upper surface 16 of the hatch 12 is positioned substantially flush with surface 8. Preferably, the hatch 12 comprises a front appendage or recess 17, which is shaped to engage with the user's finger and facilitate the rearward lifting of the hatch 12 to the open position. The hatch 12 defines a lower seat 18 having a front entrance 19 (FIG. 1), which allows an object to be inserted/extracted in a direction 21 orthogonal to axis 14 when the hatch 12 is in the open position. Instead, when the hatch 12 is in the closed position, the entrance 19 is closed by an upper portion 23 of the container 9.

The tunnel console 1 also comprises a wall 24, which is coupled to portion 6 of the container 9 such that it is movable between a lowered position and a raised position. In the raised position, the wall 24 projects upwards with respect to surface 8 and defines, at the sides, back and front, a compartment 25, which is permanently open at the top. The wall 24 is positioned around hatch 12, such that the bottom of the compartment 25 is at least partially defined by surface 16 when the hatch 12 is in the closed position.

In the lowered position, the wall 24 is preferably positioned flush with or beneath surface 8. In the particular example in FIGS. 1 and 2, the wall 24 is a rigid wall that has a substantially rectangular, closed, annular profile in plan and which is fitted around the container 9. The wall 24 engages in a sliding manner with an opening 26 defined by a slit between surface 8 and the upper edge of the container 9 and, at its bottom end, carries an appendage 27 that projects outwards with respect to the wall 24.

Preferably, a latch retaining device (indicated by reference numeral 28 in the variant in FIG. 3) is provided to keep the wall 24 in the lowered position. The retaining device is released by the user pressing a release button 29. At the same time, a spring system (not shown) pushes the wall 24 towards its raised position until it makes the appendage 27 hit against portion 6. In alternative, or in combination with the retaining device and/or the spring system, a friction holding system is provided (placed, for example, along the opening 26).

Figure 2:
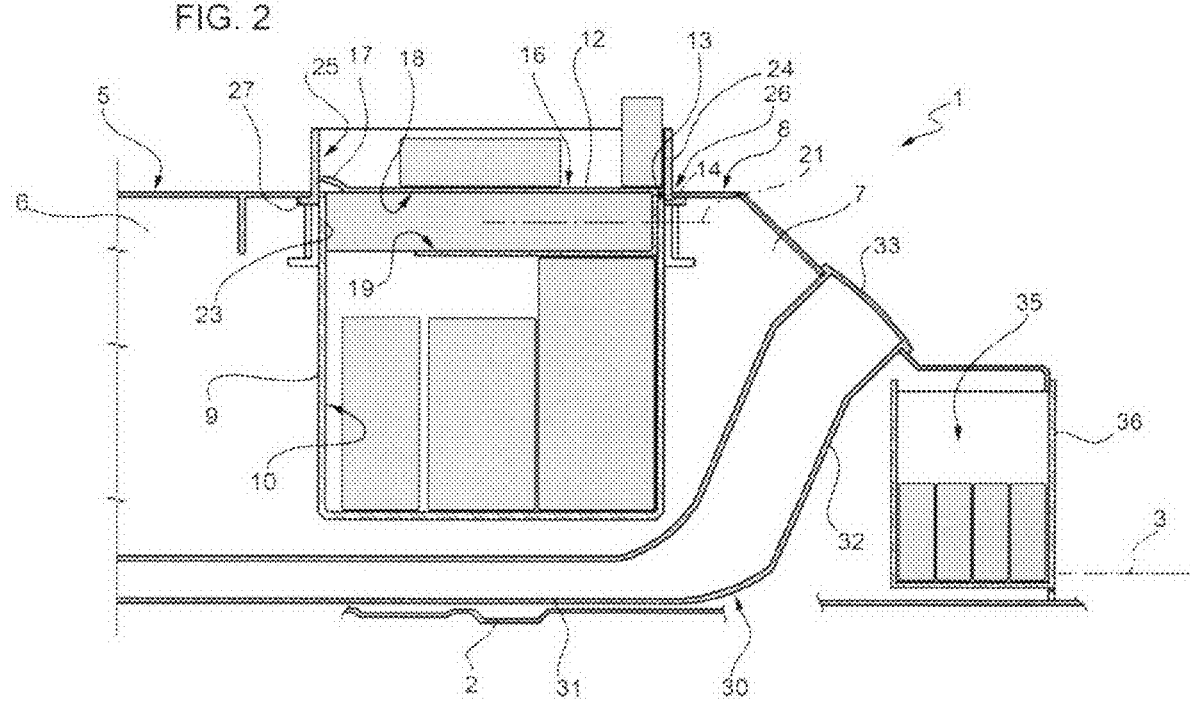
FIG. 2 is a schematic cross-section of the console along line II-II in FIG. 1, with some of the components of the console shown in a different position.

With reference to FIG. 2, the tunnel console 1 houses an air duct 30, which constitutes part of the passenger compartment's ventilation and air distribution system, and comprises a front portion 31 connected to the remainder of this system, in a manner not shown, and a rear portion 32 that ends in a vent 33 to send air to the rear passengers. Portion 31 is housed in portion 6 beneath the container 9 and has a flattened cross-section in the vertical direction. Portion 32 has a substantially circular cross-section connected to portion 31, is housed in portion 7 behind the container 9, and is upwardly inclined in the rearward direction.

The tunnel console 1 also comprises a glove compartment 35 defined by a drawer 36, which is carried by portion 7, behind the container 9 and portion 32, below the vent 33, and is longitudinally extractable in a rearwards direction from portion 7 to make compartment 35 accessible from the top, for the rear passengers in particular.

FIGS. 3 to 8 show variants, the constituent parts of which, where possible, are indicated by the same reference numerals used in FIGS. 1 and 2.

Figure 3:
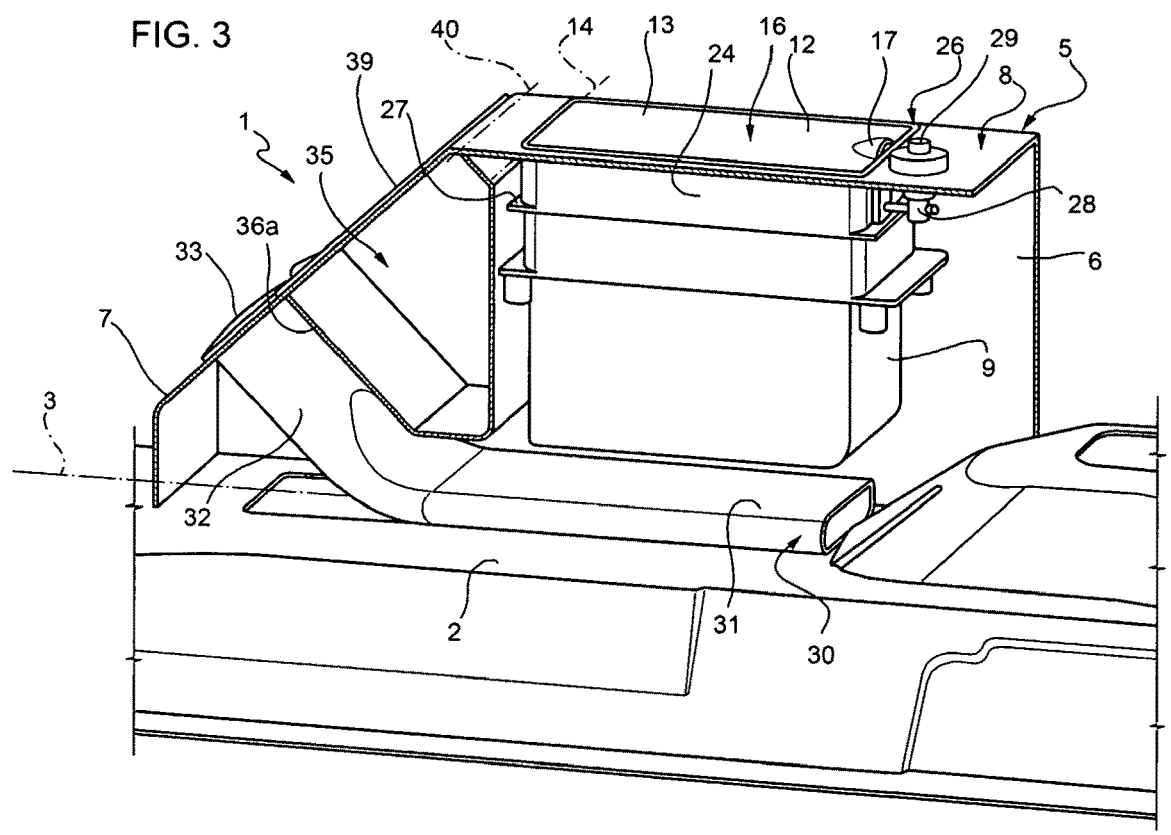
FIG. 3 shows, in perspective and with parts removed for clarity, a first variant of the console in FIG. 1.

The variant in FIG. 3 differs from what shown in FIGS. 1 and 2 in that the vent 33 is placed in a lower position and in that compartment 35 is defined by a container 36a housed in a fixed position in portion 7 behind the container 9 and above portion 32. In this case, compartment 35 is accessible by opening a hatch 39. In particular, the hatch 39 has an upper portion hinged to portion 7 to turn around an axis 40 parallel to axis 14 from a closed position, in which it is substantially coplanar with the vent 33, upwards to an open position (not shown). In this way, the opening trajectory of the hatch 39 does not disturb the airflow leaving the vent 33.

Figure 4:
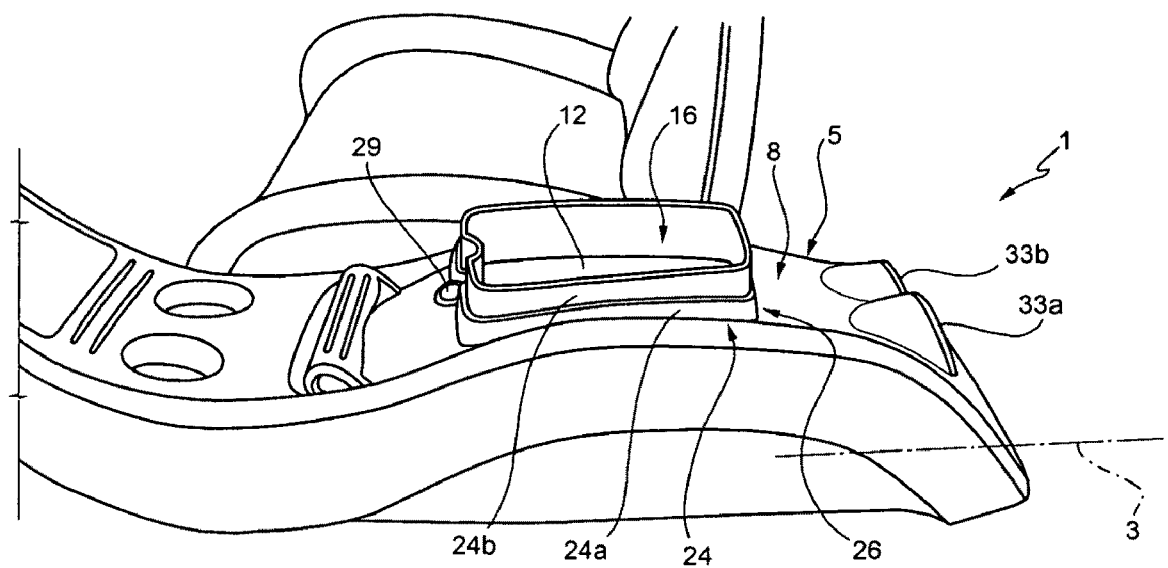
FIG. 4 is a perspective view of a second variant of the console in FIG. 1.

Apart from aesthetical differences in the structure 5, the variant in FIG. 4 differs from what shown in FIGS. 1 and 2 in the position of the release button 29, which is positioned in front of the wall 24, for the fact that the wall 24 is defined by two pieces 24a and 24b coupled together in a telescopic manner in a substantially vertical direction, and due to the presence of two vents 33a and 33b at the end of the air duct 30.

Figure 5:
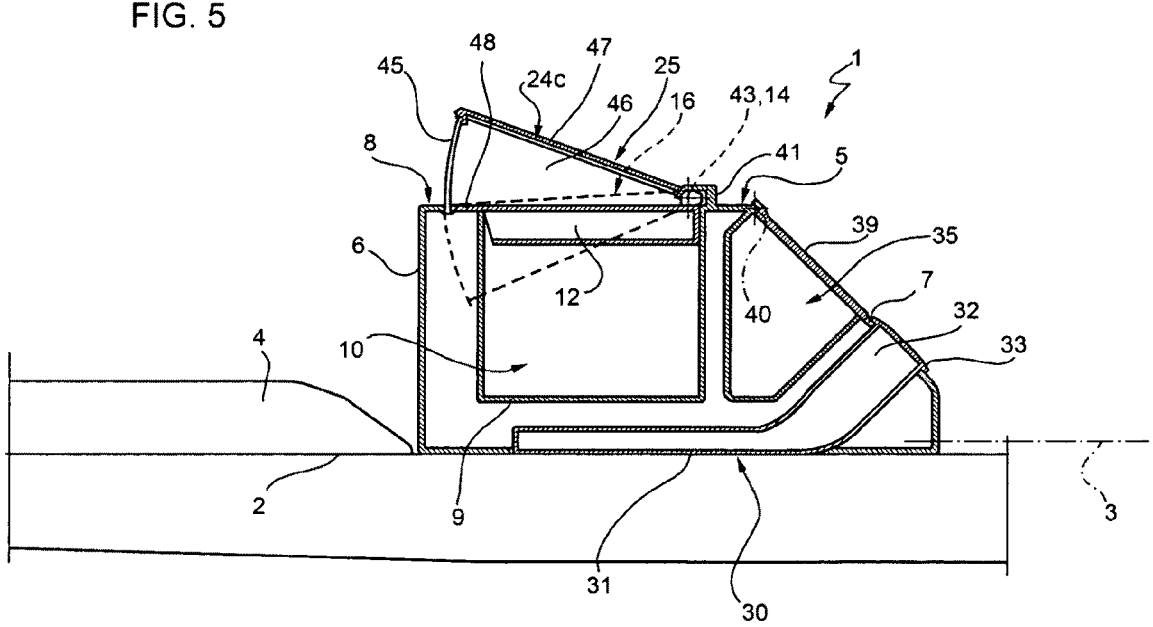
FIG. 5 is similar to FIG. 2 and shows a third variant of the console in FIG. 1.
Figure 6:
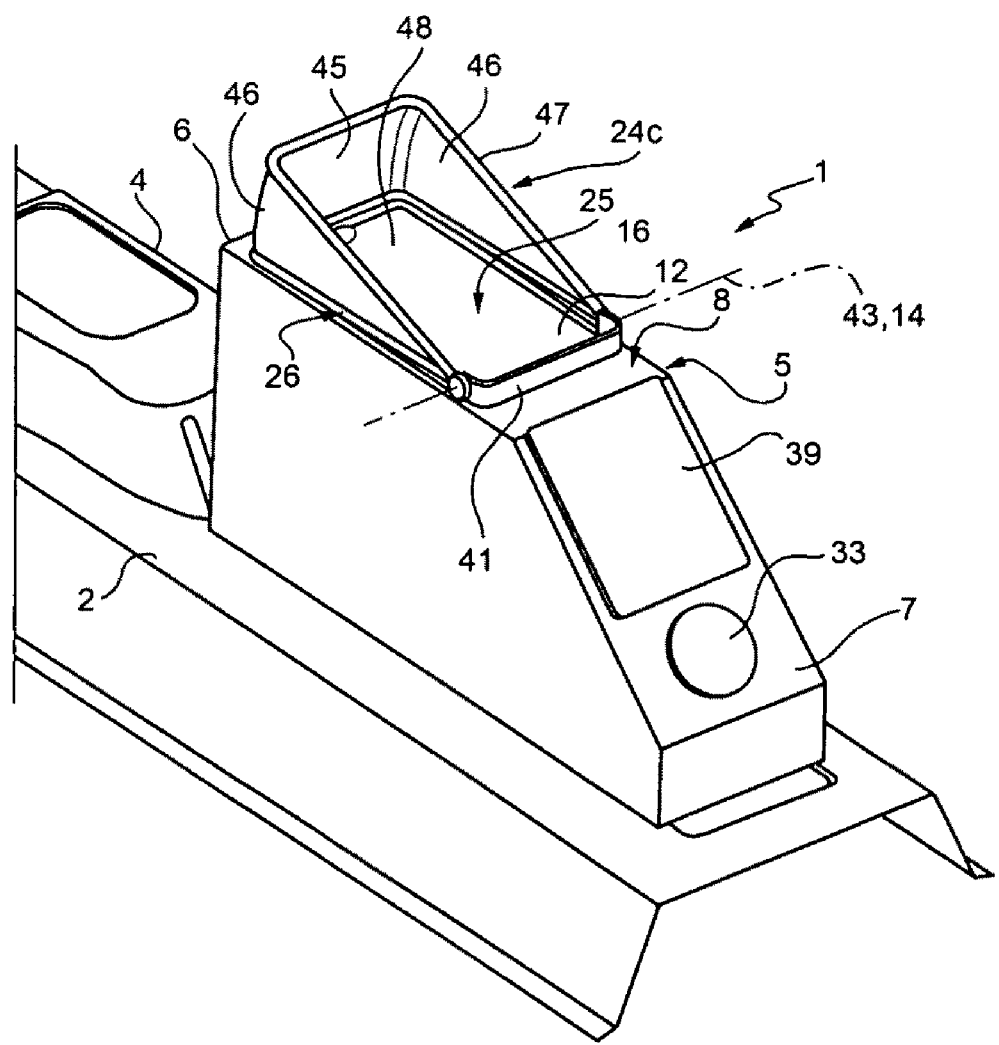
FIG. 6 shows the variant in FIG. 5 in perspective.

The solution in FIGS. 5 and 6 differs from what shown in FIG. 3 due to the absence of the button 29 and the device 28, the fact that the compartment 25 is delimited at the back by a vertical tongue 41, fixed with respect to surface 8 and preferably in one piece with the container 9, and because the wall 24 is substituted by a rigid wall 24c hinged on the tongue 41 to turn around an axis 43 coincident with axis 14.

Wall 24c comprises an intermediate portion 45 positioned in front of the container 9 and having an arc-like shape, with the centre of curvature defined by axis 43, and two side portions 46 positioned at the sides of the container 9 and shaped substantially like a sector of a circle. When wall 24c is in the raised position, the compartment 25 is delimited at the front by portion 45 and at the sides by portions 46. When in lowered position, wall 24c has an upper edge 47 that slightly projects from opening 26 with respect to surface 8 and defines a grip portion that the user can grasp by hand to move wall 24c to the raised position.

In order to have space to rotate downwards into portion 6 of the structure 5 without interfering with the container 9, portion 45 is longitudinally spaced apart from the container 9 along surface 8. The space between portion 45 and the container 9 along surface 8 is preferable covered by a front portion 48 of the hatch 12.

Figure 7:
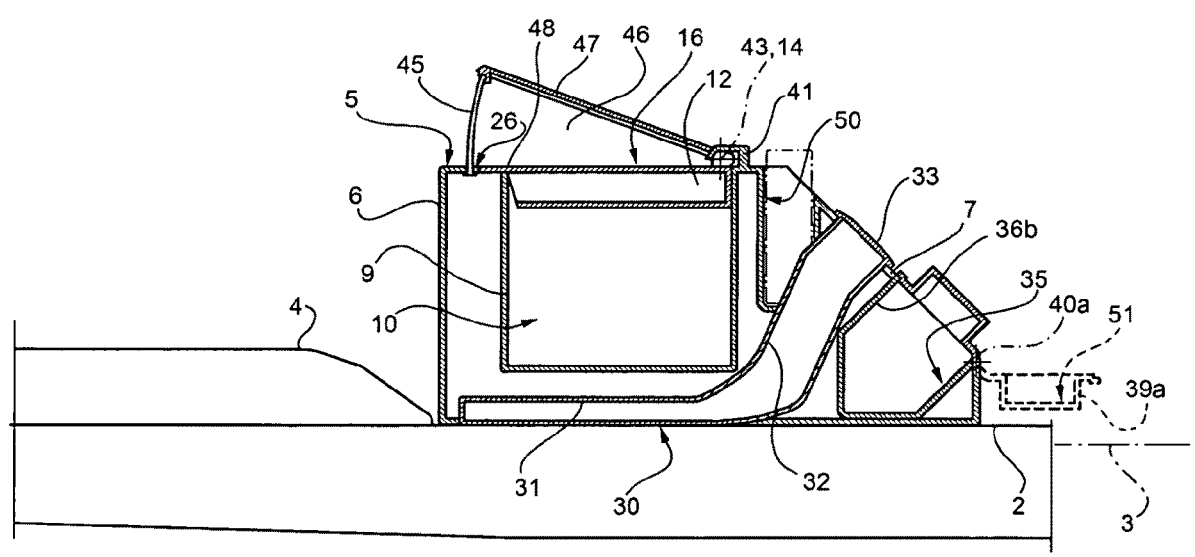
FIGS. 7 and 8 are similar to FIGS. 5 and 6 respectively and show a fourth variant of the console in FIG. 1.
Figure 8:
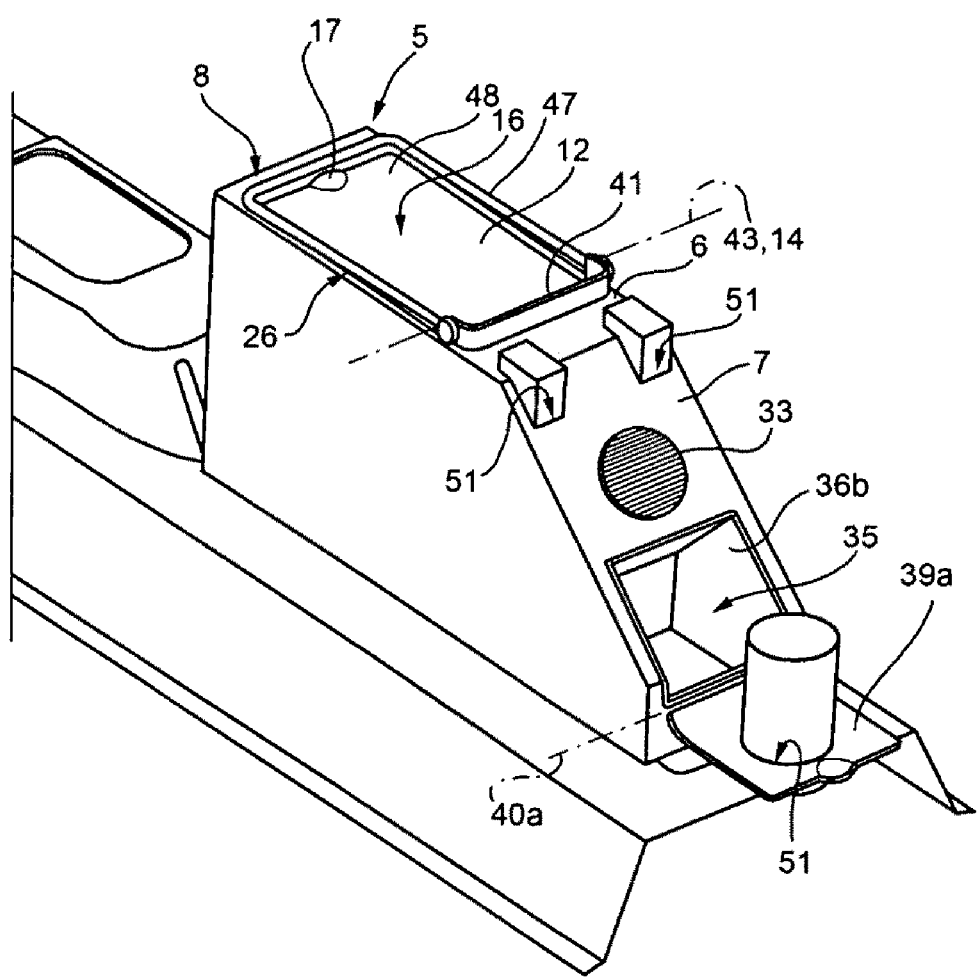

The variant in FIGS. 7 and 8 differs from what shown in FIGS. 5 and 6 due to presence of two vertical seats 50, open at the top for respectively putting away objects and positioned on opposite sides of portion 32 of the air duct 30, and because compartment 35 is defined by a container 36b, which is housed in a fixed position in portion 7 behind and below portion 32 of the air duct 30. A rear hatch 39a has one side hinged to portion 7 or to container 36b, to turn around an axis 40a parallel to axis 14 from a first position, in which it closes compartment 35 and is substantially coplanar with the vent 33, downwards to a second position (FIG. 8), in which it leaves compartment 35 open. As in the solution in FIG. 3, the opening trajectory of the hatch 39a does not disturb the airflow leaving the vent 33.

In the second position, the hatch 39a is substantially horizontal to define a support and, on its upward-facing side, defines a seat 51 that can be used to accommodate and support the bottom of an object, such as a can for example.

From what explained above, it is evident how the wall 24,24c allows an outer glove compartment 25 to be obtained in a simple manner in case of need, without creating significant additional occupied space with respect to that occupied by the other components of the tunnel console 1. The wall 24,24c provides both versatility of use and a certain aesthetic quality to the tunnel console 1.

Furthermore, the wall 24 could also be used as an armrest for the front seats, which are positioned at the side of the tunnel console.

The tunnel console 1 is also useful for rear passengers, not only thanks to the air duct 30, but also to compartment 35, which is placed in a position such as to keep the dimensions of portion 7 of the tunnel console 1 compact. In particular, when open in the horizontal position, hatch 39a allows access to both seat 51 and compartment 34 at the same time. Secondly, the air duct 30 has characteristics that render the tunnel console 1 extremely compact.

Finally, it is clear that that modifications and variants can be made to the tunnel console 1 described and shown herein without leaving the scope of protection of the present invention, as defined in the enclosed claims.

In particular, instead of being rigid, the rotating wall 24c or sliding wall 24 could be defined by a folding element that assumes an upright position when raised with respect to portion 6 of the structure 5 and is concertina-folded for lowering against surface 8 or into a seat flush with surface 8.

The invention claimed is:

1. Console for the tunnel of the passenger compartment of a vehicle, the console comprising:
   an outer structure,
   at least one inner compartment arranged in a fixed position in said outer structure,
   a hatch, movable between a closed position and an open position to close/open an entrance of said inner compartment, and
   a wall structure positioned between the inner compartment and the outer structure so as to be outside of said inner compartment and of said hatch and movable, in response to an action by the user, between a raised position and a lowered position with respect to an upper surface of said outer structure; so that when located in the raised position, said wall structure projects upwardly and beyond said hatch and with respect to said upper surface and thereby defining an outer compartment.

2. The console according to claim 1, wherein the outer compartment has a lower surface defined by said hatch when said hatch is located in the closed position.

3. The console according to claim 1, wherein the wall structure, in the raised position, delimits said outer compartment at least at the front and sides.

4. The console according to claim 1, wherein the wall structure is a rigid wall and is movable inside said structure to the lowered position through an opening.

5. The console according to claim 1, wherein the wall, in the lowered position, is positioned flush with or below said upper surface.

6. The console according to claim 1, wherein the wall structure is composed of at least two elements coupled together in a vertically telescopic manner.

7. The console according to claim 4, wherein the wall can turn with respect to said structure around a horizontal axis to rotate between the raised and lowered positions.

8. The console according to claim 7, wherein the hatch is hinged around a hinge axis coincident with said horizontal axis.

9. The console according to claim 1, further including an air duct comprising:
- a first portion positioned beneath said inner compartment and having a cross-section flattened in the vertical direction, and
- a second portion having a substantially circular cross-section, positioned behind said inner compartment, upwardly inclined in the rearward direction and ending in an air vent.

10. The console according to claim 1, further including an additional inner compartment positioned behind said inner compartment.

11. The console according to claim 10, wherein the additional inner compartment is accessible via a rear hatch rotatable downwards from a closed position to an open position, the rear hatch being substantially horizontal in the open position to define a support.

12. The console according to claim 11, wherein the rear hatch defines a seat that, in the open position of the rear hatch, is facing upwards to accommodate and support the bottom of an object.

13. The console according to claim 10, further including an air duct positioned between said inner compartment and said additional inner compartment and wherein the additional inner compartment is defined by an extractable drawer positioned beneath a vent from said air duct.

14. The console according to claim 9, wherein the additional inner compartment is positioned behind the second portion of said air duct.

15. The console according to claim 9, wherein the additional inner compartment is positioned between the second portion of said air duct and said inner compartment.

16. A console for the tunnel of a passenger compartment of a vehicle, the console comprising:
- an outer structure,
- at least one inner compartment arranged in a fixed position in said structure,
- a hatch, movable between a closed position and an open position to close/open an entrance of said inner compartment, and
- a wall positioned outside of said inner compartment and movable, in response to an action by the user, between a raised position and a lowered position with respect to an upper surface of said structure; when located in the raised position, said wall projects upwardly with respect to said upper surface and defining an outer compartment, wherein said outer compartment has a lower surface defined by said hatch when said hatch is located in the closed position.

* * * * *